(12) United States Patent  
Ingraham (10) Patent No.: US 7,530,453 B2  
(45) Date of Patent: May 12, 2009

(54) ADJUSTABLE NECK GUIDE

(75) Inventor: Thomas M. Ingraham, Fort Collins, CO (US)

(73) Assignee: Advanced Manufacturing Technology, Loveland, CO (US)

( * ) Notice: Subject to any disclaimer, the term of this patent is extended or adjusted under 35 U.S.C. 154(b) by 250 days.

(21) Appl. No.: 11/554,216

(22) Filed: Oct. 30, 2006

(65) Prior Publication Data

US 2008/0210517 A1 Sep. 4, 2008

(51) Int. Cl.
*B65G 15/00* (2006.01)
*B65G 17/00* (2006.01)
*B65G 15/10* (2006.01)

(52) U.S. Cl. .................. 198/836.3; 198/817; 198/836.4

(58) Field of Classification Search .............. 198/466.1, 198/836.3, 817, 836.4
See application file for complete search history.

(56) References Cited

U.S. PATENT DOCUMENTS

| 4,802,571 | A * | 2/1989 | Born et al. ................ 198/626.1 |
| 6,827,203 | B2 * | 12/2004 | Andreoli et al. .......... 198/836.3 |
| 2002/0192038 | A1 * | 12/2002 | Trenel et al. .................. 406/88 |
| 2003/0164280 | A1 * | 9/2003 | Delaporte et al. ......... 198/836.3 |

* cited by examiner

*Primary Examiner*—John Q. Nguyen
*Assistant Examiner*—Yolanda Cumbess
(74) *Attorney, Agent, or Firm*—Santangelo Law Offices, P.C.

(57) ABSTRACT

A container transport system can have adjustable neck guides coupled along a container transport line and a neck guide positioning system operably coupled thereto. The neck guide positioning system can move the neck guides relative to the container transport line in correspondence with shapes of containers. The neck guides can extend continuously along the container transport line.

20 Claims, 8 Drawing Sheets

ADJUSTABLE NECK GUIDE

FIELD

The present invention relates to a container handling system and, more particularly, to a bottle handling system which includes an adjustable neck guide system along a conveyor.

BACKGROUND

The statements in this section merely provide background information related to the present disclosure and may not constitute prior art.

Currently, various packaging and shipping methods are used to transport containers, such as bottles, from one location to another. As such, it is often necessary to provide a bottle conveyor to transfer bottles from one machine to another in the handling process. Such conveyor systems will often utilize a neck guide assembly to support the bottles as they are transferred along the conveyor.

Neck guide mechanisms are typically constructed as fixed elements relative to the conveyor structure. Different neck guide mechanisms are designed for different bottle shapes. When the bottles to be produced are changed, the neck guide assembly must also be changed, which can be relatively costly.

In recent years, variations in shapes and sizes of containers have proliferated. Accordingly, it is desirable to have a system which allows neck guides along a conveyor to be adjusted so that a system may accommodate a variety of bottle shapes.

SUMMARY

A neck guide positioning system for a container transport line is provided. The neck guide positioning system has a plurality of stop members including a movable stop member. The movable stop member is selectively movable between an extended position and a retracted position. The neck guide positioning system may also include a fixed stop member is fixed relative to the container transport line. The extended position of the movable stop member is between a center line of the container transport line and the fixed stop member, and the retracted position is further away from the center line of the container transport line than the fixed stop member. The neck guide positioning system further includes a bracket disposed between the container transport line and the plurality of stop members, the bracket supporting a neck guide along the container transport line. The neck guide positioning system also includes a first actuator operably coupled to the bracket. The first actuator selectively engages the bracket with at least one of the plurality of stop members. Moving the movable stop member to the retracted position and engaging the bracket with the fixed stop member locates the neck guide in correspondence with a first neck guide spacing. Furthermore, moving the movable stop member to the extended position and engaging the bracket with the movable stop member locates the neck guide in correspondence with a second neck guide spacing which is less than the first neck guide spacing.

In another form, a container transport system is provided. The container transport system includes an infeed machine for collecting a plurality of containers, a discharge machine for receiving the containers, a container transport line extending between the infeed machine and the discharge machine, and a pair of neck guide assemblies each supporting a neck guide along opposite sides of the container transport line. The container transport system further includes a plurality of neck guide positioning mechanisms operably coupled to each one of the neck guide assemblies. Each of the neck guide positioning mechanisms has a movable stop member selectively movable to an extended position and a retracted position. The neck guide positioning mechanism may also include a fixed stop member secured relative to the container transport line. The extended position of the movable stop member is between a center line of the container transport line and the fixed stop member, and the retracted position is further away from the center line than the fixed stop member. Each of the neck guide positioning mechanisms further include a first actuator coupled to the one of the neck guide assemblies. The first actuator selectively engages the one of the neck guide assemblies with at least one of the plurality of stop members. Furthermore, moving the movable stop members to the retracted positions and engaging the neck guide assemblies with the fixed stop members locates the neck guides in correspondence with a first neck guide spacing. Additionally, moving the movable stop members to the extended positions and engaging the neck guide assemblies with the movable stop members locates the neck guides in correspondence with a second neck guide spacing.

In another form, a method of positioning a neck guide for a container packaging system is provided. The method includes fixing a first stop member relative to a container transport line in correspondence with a first neck guide spacing, and engaging a neck guide assembly with the first stop member, the neck guide assembly supporting a neck guide along the container transport line.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals (e.g., 15*a* and 15*b*, and/or 15, 15', and 15") indicate like or corresponding parts and features.

Figure 1:
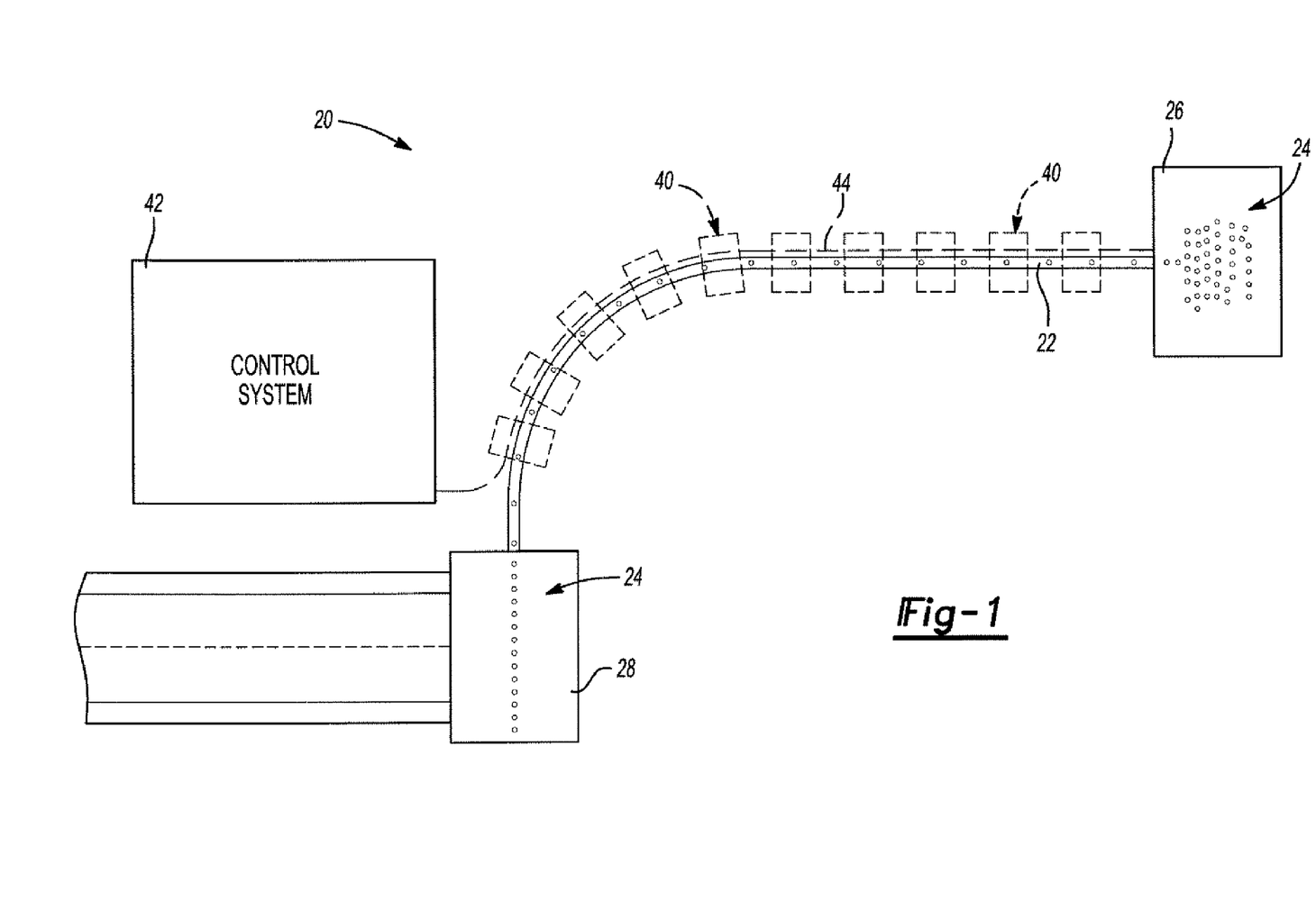
FIG. 1 is a top view of a container transport system according to the principles of the present disclosure.

Referring to FIG. 1, an exemplary container transport or conveyor system 20 for a container packaging system is shown. Container transport system 20 includes a container transport line or conveyor 22 along which containers 24 are transported from an infeed machine 26 to a discharge machine 28. Infeed machine 26 collects a plurality of containers 24 and introduces them to container transport system 20 which accumulates and transports containers to discharge machine 28. As illustrated, container transport line 22 can have a non-linear path or a path having a non-linear portion between infeed machine 26 and discharge machine 28.

While traveling through container transport system 20, containers 24 are supported by a pair of neck guides 30 (FIG. 2) coupled along opposing sides of container transport line 22. As is described in more detail herein, each of neck guides 30 extends continuously along container transport line 22 and is supported by a neck guide assembly 32.

Container transport system 20 further includes a neck guide positioning system for locating neck guides 30 in correspondence with different shapes of containers 24 and specifically containers having different diameter necks. The neck guide positioning system includes a plurality of neck guide positioning mechanisms 40 which support and move neck guide assemblies 32 to position neck guides 30 along container transport line 22. As shown in FIG. 1, neck guide positioning mechanisms 40 can be coupled in pairs at opposing positions along container transport line 22. It is to be understood that neck guide positioning mechanisms 40 can be coupled in a variety of configurations along container transport line 22.

Furthermore, the neck guide positioning system includes a control system 42 operably connected to neck guide positioning mechanisms 40 with a communication line 44 extending along container transport line 22. As described in more detail below, the control system 42 can be configured to receive inputs from a user and provide for operation of neck guide positioning mechanisms 40 in accordance therewith.

Figure 2:
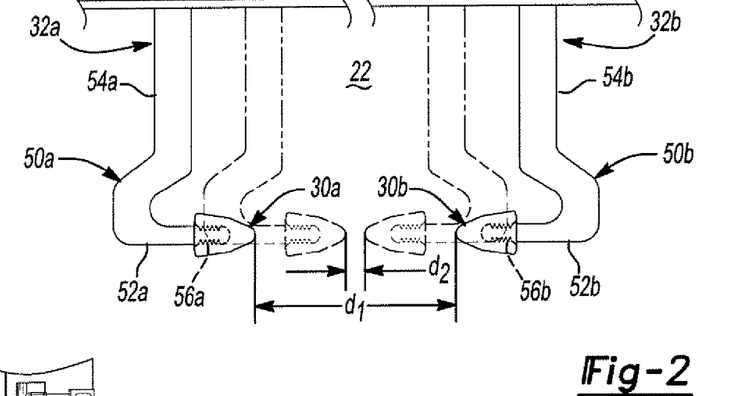
FIG. 2 is a front elevation of an adjustable neck guide assembly according to the principles of the present disclosure.

Referring to FIG. 2, neck guides 30 and neck guide assemblies 32 are illustrated in detail. In particular, a first neck guide 30*a* and a first neck guide assembly 32*a* are disposed on one side of container transport line 22, and a second neck guide 30*b* and a second neck guide assembly 32*b* are disposed on the other side of container transport line 22. Neck guide assemblies 32*a*, 32*b* may be adjusted relative to a center line of the container transport line 22. By laterally adjusting the position of the neck guide assemblies 32*a*, 32*b*, the spacing therebetween may be configured for a given neck diameter. For example, in a first location, the neck guide assemblies 32*a*, 32*b* may be set for a large diameter neck $d_1$. The neck guide assemblies 32*a*, 32*b* may be moved inwardly and set for a small diameter neck $d_2$.

It should be understood that first and second neck guides 30*a*, 30*b*, first and second neck guide assemblies 32*a*, 32*b*, and the components related thereto are substantially similar or identical, yet arranged in mirrored symmetry about container transport line 22. Accordingly, in the interest of brevity, only one of neck guides 30*a*, 30*b*, first and second neck guide assemblies 32*a*, 32*b*, and the components related thereto will be discussed in detail unless noted otherwise. Additionally, it should be noted that these features can be referred to collectively (e.g. "neck guides 30") and that a collective description applies equally to each of the individual features.

First neck guide assembly 32*a* includes a first bracket 50*a* supporting first neck guide 30*a* on an end 52*a* thereof. End 52*a* extends inwardly towards container transport line 22 from a main portion 54*a* of first bracket 50*a*. End 52*a* has a toothed portion 56*a* formed therein. Toothed portion 56*a* engages and secures first neck guide 30*a* relative to first bracket 50*a* in a direction extending perpendicular to container transport line 22. However, this engagement also allows for relative movement or slip between first neck guide 30*a* and first bracket 50*a* in a direction extending parallel to container transport line 22. As explained in more detail herein, this relative movement in the direction parallel to container transport line 22 bridges the gap between adjacent brackets to provide a continuous path along container transport line 22 for containers 24.

Neck guides 30 and neck guide assemblies 32 can include a variety of materials. Neck guides 30 extend continuously along container transport line 22, and container transport line 22 can have a non-linear path or non-linear portion thereof. Accordingly, neck guides 30 can include a variety of resilient, elastically deformable materials. For example, neck guides 30 can include oil impregnated ultra high weight polyethylene. Furthermore, neck guide assemblies 32 and the components thereof can be made of a variety of relatively rigid materials including, for example, metals such as extruded aluminum.

As the components of neck guide assemblies 32, in particular brackets 50, can include relatively rigid materials, and as container transport line 22 can have a non-linear path (FIG. 1), neck guide assemblies 32 can each include a plurality of brackets 50 coupled along container transport line 22. As described in more detail below, adjacent brackets 50 of one of neck guide assemblies 32 are coupled to maintain alignment therebetween.

Figure 3:
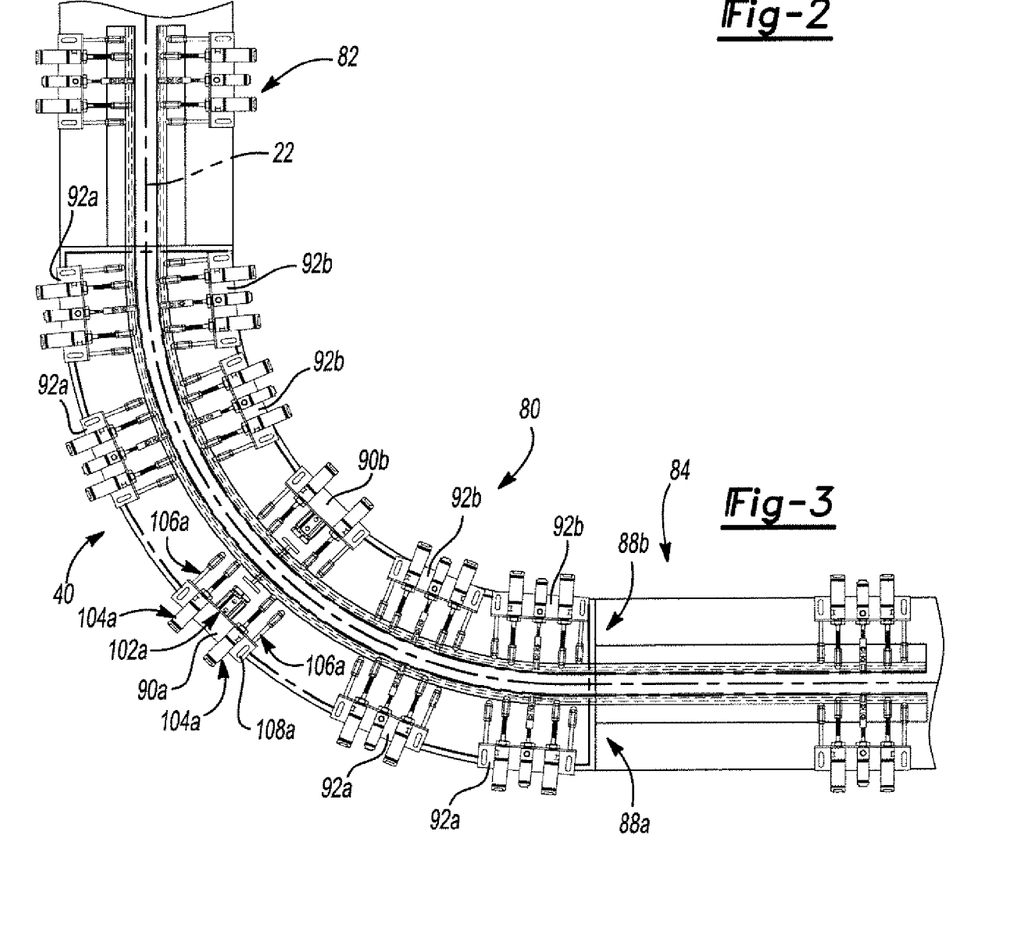
FIG. 3 is a top view of a portion of a container transport line according to the principles of the present disclosure having a plurality of neck guide positioning mechanisms.

Referring to FIG. 3, an exemplary portion of container transport line 22 has a plurality of neck guide positioning mechanisms 40 disposed proximate thereto. The illustrated portion of container transport line 22 includes a curved section 80 between a first linear section 82 and a second linear section 84. According to the principles of the present disclosure, neck guide positioning mechanisms 40 move neck guide assemblies 32 and locate neck guides 30 to provide an adjustable neck guide spacing.

A plurality of neck guide positioning mechanisms 40 are coupled along each of first and second sides 88*a*, 88*b* of curved section 80. The plurality of neck guide positioning mechanisms 40 coupled along curved section 80 includes first and second main mechanisms 90*a*, 90*b* and a plurality of first and second pivotable mechanisms 92*a*, 92*b*. It is to be understood that neck guide positioning mechanisms and the components thereof having corresponding reference numerals (e.g., first and second main mechanisms 90*a*, 90*b*) are substantially similar or the same. Accordingly, in the interest of brevity, only one of such neck guide positioning mechanisms will be described in detail herein unless noted otherwise. Additionally, it will be understood that a collective description of such neck guide mechanisms (e.g., main mechanisms 90) or the components thereof applies to each individually.

Figure 4A:
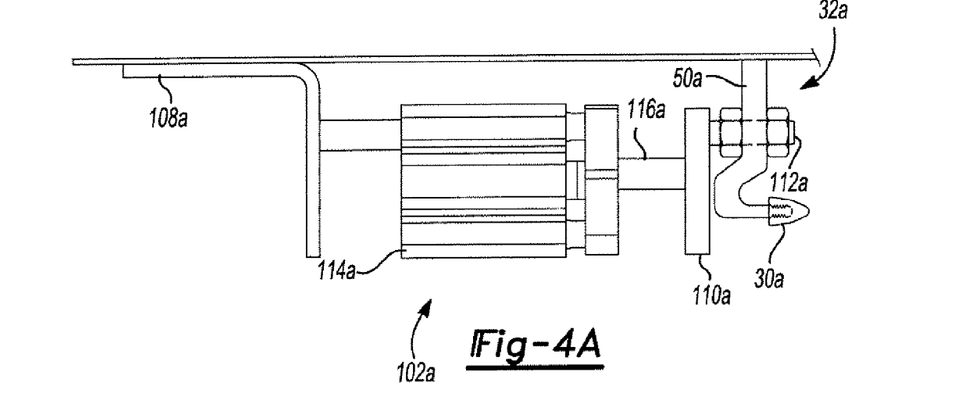
FIGS. 4A-4C are front elevations of components of a neck guide positioning mechanism according to the principles of the present disclosure engaged with and positioning a neck guide assembly in a first position.
Figure 4B:
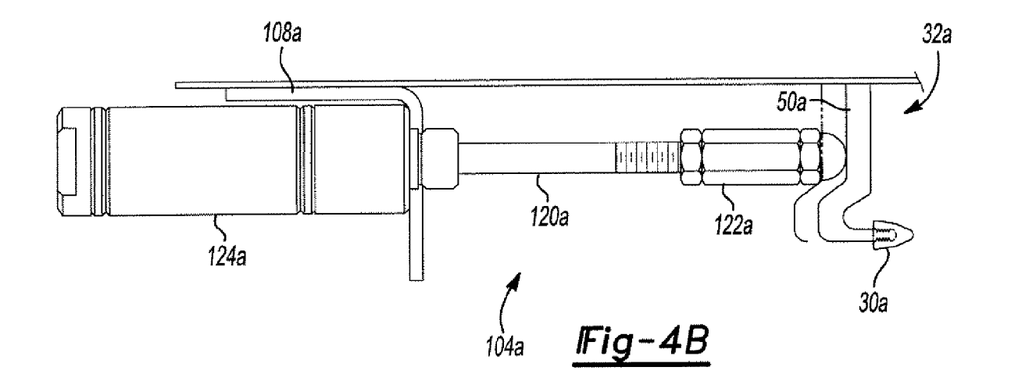
Figure 4C:
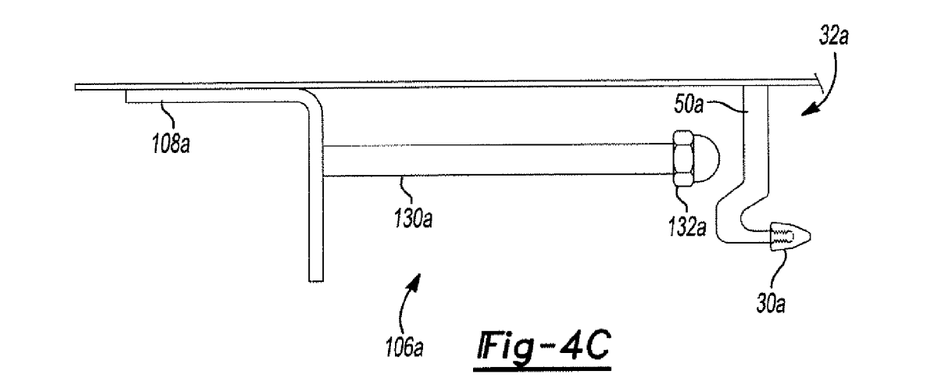
Figure 5A:
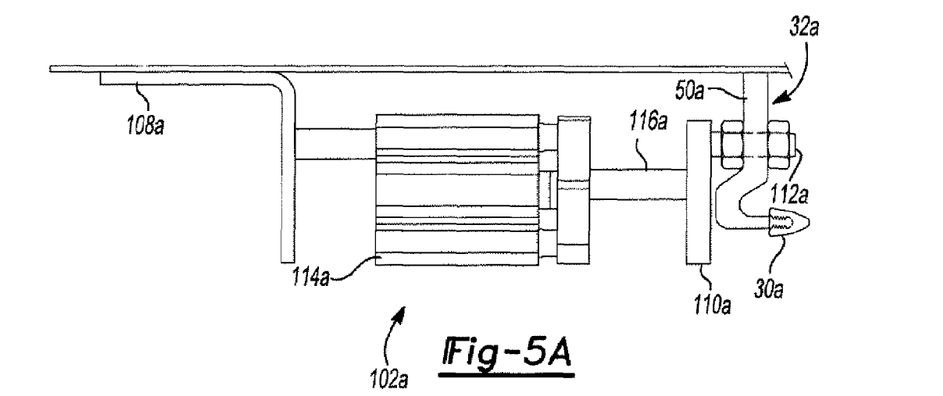
FIGS. 5A-5C are front elevations of the components of the neck guide positioning mechanism of FIGS. 4A-4C engaged with positioning the neck guide assembly in an intermediate fashion.
Figure 5B:
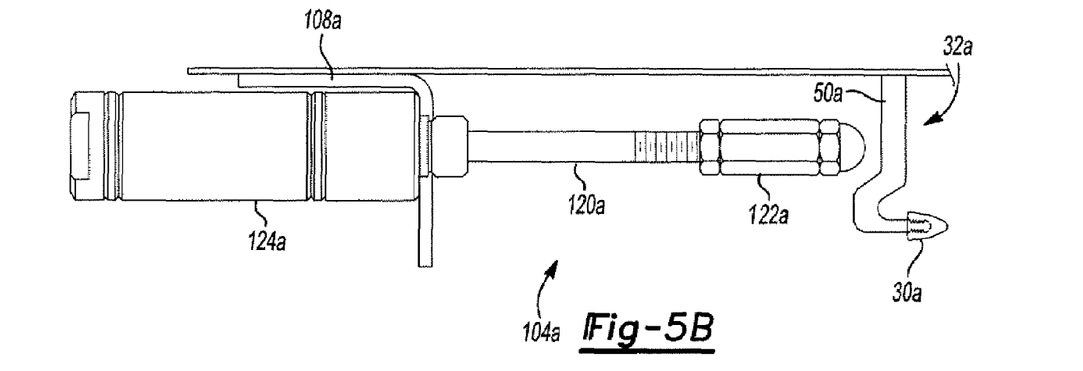
Figure 5C:
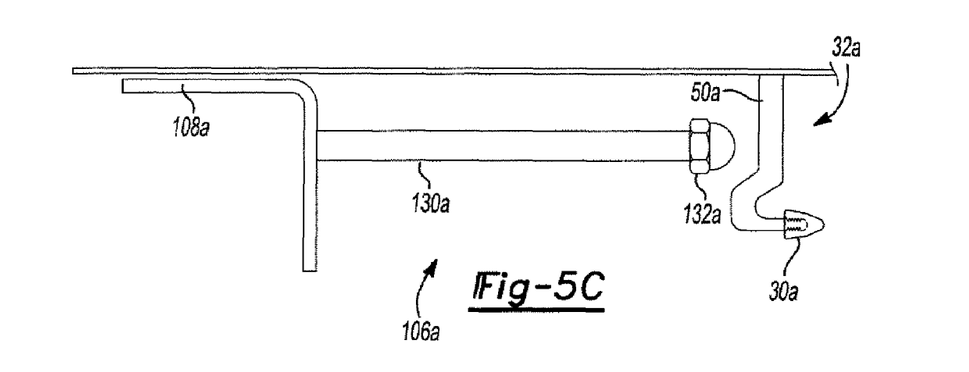
Figure 6A:
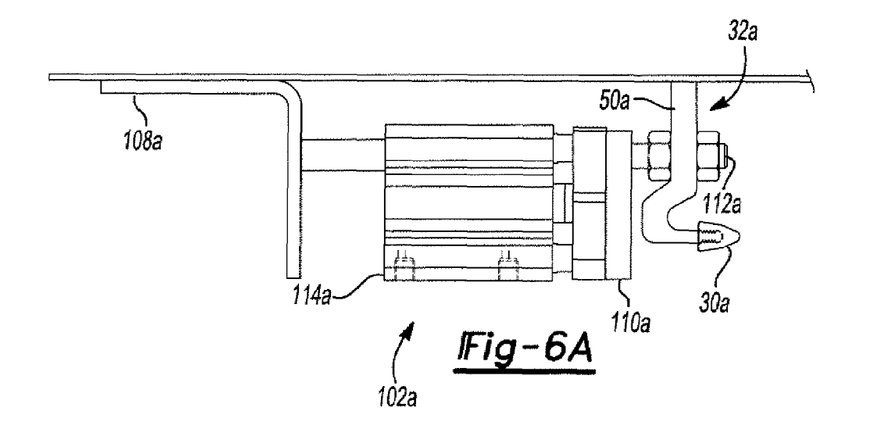
FIGS. 6A-6C are front elevations of the components of the neck guide positioning mechanism of FIGS. 4A-4C engaged with positioning the neck guide assembly in a second position.
Figure 6B:
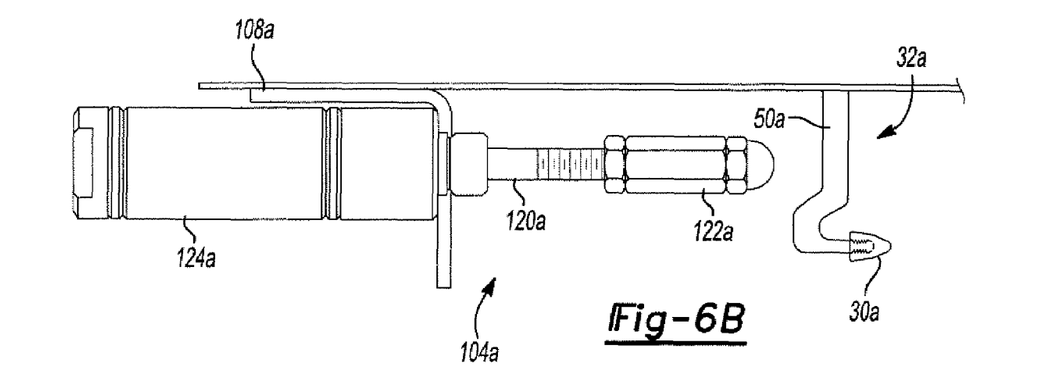
Figure 6C:
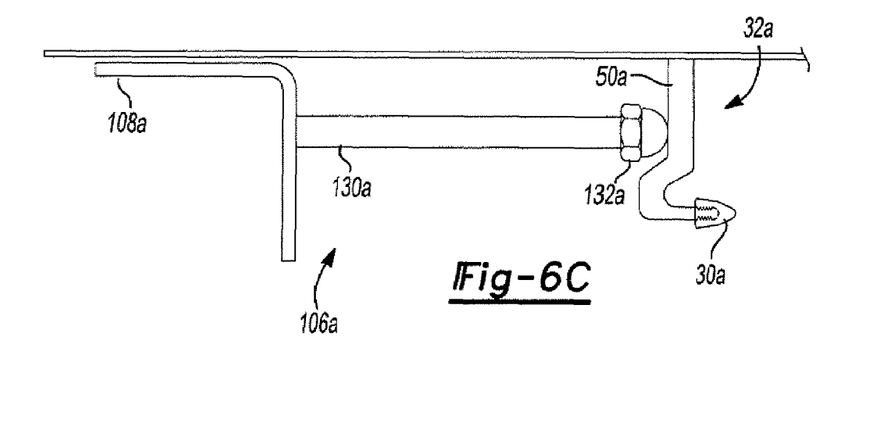

First main mechanism 90a is disposed at a center position of first side 88a of curved section 80. With further reference to FIGS. 4-6, first main mechanism 90a includes an actuator assembly 102a, a pair of movable stop assemblies 104a, and a pair of fixed stop assemblies 106a all secured to a base 108a. Actuator assembly 102a is operably coupled to first neck guide assembly 32a (FIGS. 4A, 5A, 6A). In particular, a tooling plate 110a is fixed to first bracket 50a with fastening assembly 112a. Tooling plate 110a is coupled to an actuator 114a operable to move first neck guide assembly 32a relative to container transport line 22. As illustrated in the Figures, actuator 114a can be in the form of an air cylinder. Tooling plate 110a and actuator 114a are coupled by a coupling 116a. Coupling 116a can be, for example, an angle bracket. With first main mechanism 90a having a center position of first side 88a of curved section 80, and with tooling plate 110a fixed to first neck guide assembly 32a, first main mechanism 90a keeps first neck guide assembly 32a centered on first side 88a of curved section 80.

Movable stop assemblies 104a of first main mechanism 90a each include a shaft 120a, a stop member 122a disposed at the end of each shaft 120a and an actuator 124a supporting each of shafts 120a. Actuators 124a selectively move shafts 120a and stop members 122a between a first position (FIG. 4B) with stop members 122a extending past fixed stop assemblies 106a and a second position with stop members 122a behind fixed stop assemblies 106a (FIGS. 6B). As illustrated in the Figures, actuators 124a can be in the form of air cylinders. Furthermore, shaft 120a can be threaded and stop member 122a can be correspondingly threaded such that the precise position of stop member 122a on shaft 120a is adjustable. Fixed stop assemblies 106a each include a shaft 130, secured to base 108a and a stop member 132a secured to shaft 130a opposite base 108a. Shaft 130a may also be threaded like shaft 120a to allow for fine adjustment of the fixed stop position.

Figure 7A:
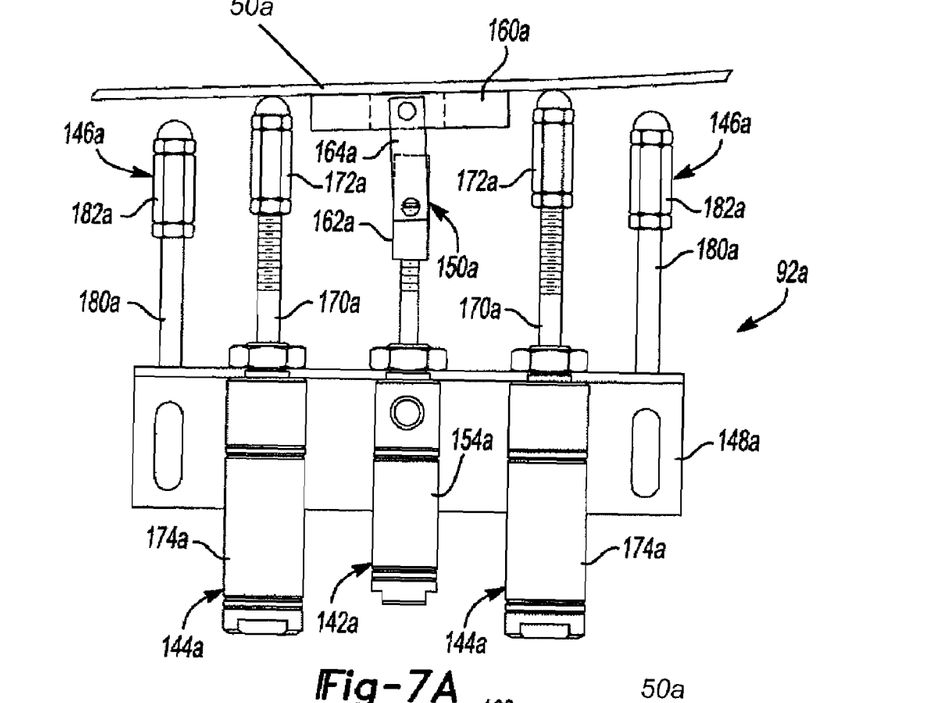
FIGS. 7A and 7B are top views of a neck guide positioning mechanism according to the principles of the present disclosure positioning the neck guide assembly in a first position and a second position, respectively.
Figure 7B:
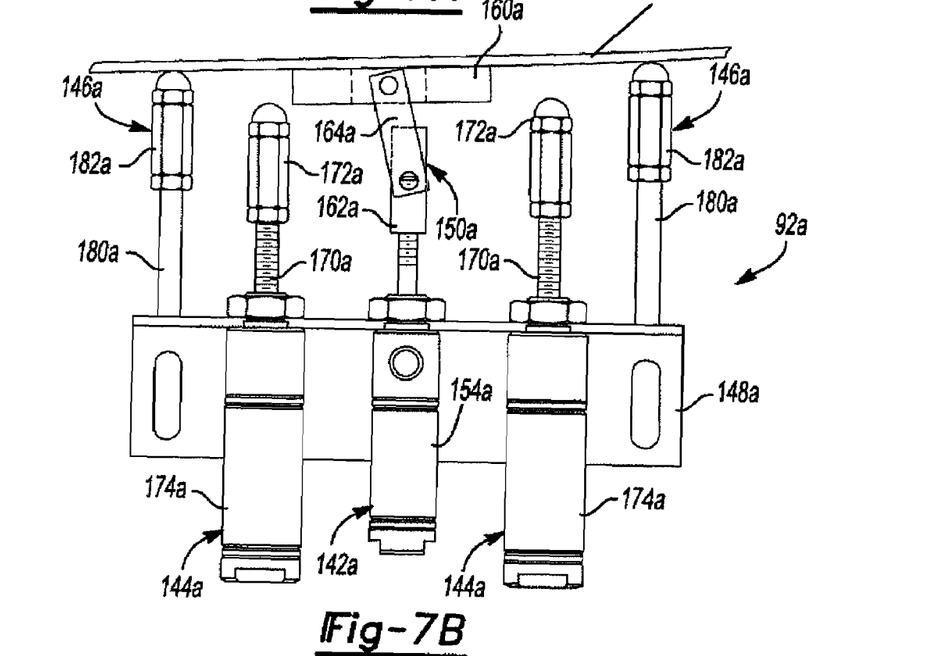
Figure 8A:
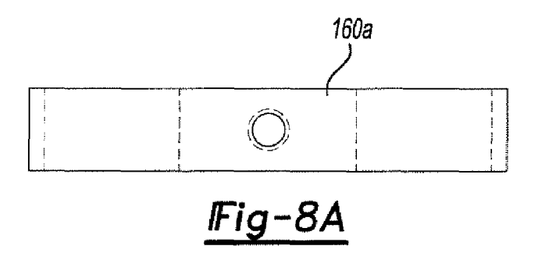
FIGS. 8A-8C are top views of components of an actual coupling assembly according to the principles of the present disclosure.
Figure 8B:
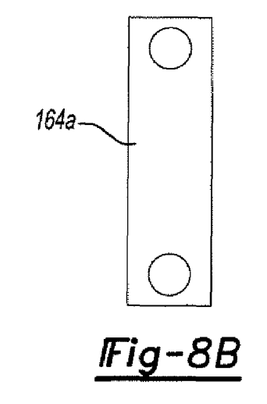
Figure 8C:
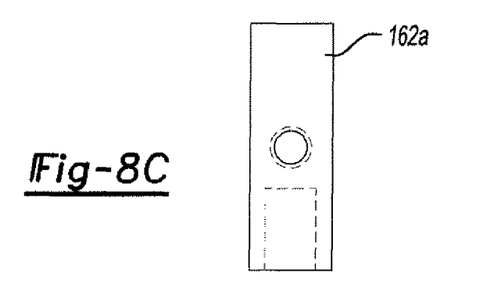

First pivotable mechanisms 92a are disposed around first main mechanism 90a on first side 88a of curved section 80. Referring to FIGS. 7A-7B, an exemplary first pivotable mechanism 92a is illustrated. First pivotable mechanism 92a includes an actuator assembly 142a, a pair movable stop assemblies 144a, and a pair of fixed stop assemblies 146a secured to a base 148a.

Actuator assembly 142a of first pivotable mechanism 92a is operably coupled to first neck guide assembly 32a. With further reference to FIGS. 7A and 7B, a pivoting assembly 150a is coupled between first bracket 50a and an actuator 154a. Pivoting assembly 150a has a bracket member 160a fixed to first bracket 50a, an actuator member 162a fixed to actuator 154a, and an intermediate member 164a pivotally coupled to each of bracket member 160a and actuator member 162a. Pivoting assembly 150a provides for relative movement between first bracket 50a and actuator 154a in a direction extending along container transport line 22. Additionally, as illustrated in FIGS., actuator 154a can be in the form of an air cylinder.

Unless otherwise noted, movable stop assemblies 144a and fixed stop assemblies 146a are substantially similar or the same as movable stop assemblies 104a and fixed stop assemblies 106a of first main mechanism 90a described herein. Movable stop assemblies 144a each include a shaft 170a, a stop member 172a, and an actuator 174a. Actuators 174a selectively move shafts 170a and stop members 172a between first positions (FIG. 7A) and second positions (FIGS. 7B). However, the first and second positions of stop members 172a are offset. This configuration allows movable stop assemblies 144a to engage with a neck guide assembly 32a having a non-linear shape. Fixed stop assemblies 146a each include a shaft 180a secured to base 148a and a stop member 182a secured to shaft 180a opposite base 148a. Stop members 182a are also offset to correspond with the configuration of movable stop assemblies 144a and to engage with the neck guide assembly 32a with a non-linear shape.

Although the neck guide positioning mechanisms described herein each include only a single pair of movable stop assemblies, it should be understood that neck guide positioning mechanisms according to the principles of the present invention can have a plurality of movable stop assemblies or pairs thereof providing for a variety of positions of neck guides. In such a case, each of the movable stop assemblies or pairs thereof would have an extended position in between the fixed stop assemblies and the container transport line. Furthermore, each of the movable stop assemblies or pairs thereof would have different extended positions from each of the other movable stop mechanisms or pairs thereof. Therefore, a varying number of positions of the neck guides can be provided according to the principles of the present disclosure. Additionally, it should be understood that the actuator assemblies can have a variety of components and configurations according to the principles of the present disclosure.

Referring to FIGS. 4A-4C, first main mechanism 90a locates first neck guide 30a in a first position. Movable stop assemblies 104a actuate stop members 122a to the extended positions (FIG. 4B). Actuator 114 pulls first bracket 50a into engagement with stop members 122a. As such, first bracket 50a is not in contact with stop members 132 of fixed stop assemblies 106a.

Referring to FIGS. 5A-5C, first main mechanism 90a moves first neck guide 30a and first bracket 50a to an intermediate position. Although stop members 122a of movable stop assemblies 104a are in the extended positions, first bracket 50a is displaced away from stop members 122a. This intermediate position allows for actuation of movable stop assemblies 104a without interference from first bracket 50a.

Referring to FIGS. 6A-6C, first main mechanism 90a locates first neck guide 30a in a second position. Movable stop assemblies 104a actuate stop members 122a to retracted positions (FIG. 6B). Actuator 114 pulls first bracket 50a into engagement with stop members 132a of fixed stop assemblies 106a (FIG. 6C). To return first neck guide 30a to the first position, the steps can be reversed. As such, container transport system 20 has adjustable neck guides 30 that can adapt to different sizes and shapes of containers 24.

Referring to FIG. 7A, exemplary first pivotable mechanism 92a locates first bracket 50a (and, therefore, first neck guide 30a) in a first position corresponding with the first position provided by first main mechanism 90a (FIGS. 4A-4C). In particular, first pivotable mechanism 92a has stop members 172a of movable stop assemblies 144a in the extended positions, and first bracket 50a is engaged with stop members 172a. As first pivotable mechanism 92a is engaged with a curved first bracket 50a, the locations of stop members 172a of movable stop assemblies 144a in the extended positions are offset.

Referring to FIG. 7B, first pivotable mechanism 92a locates first bracket 50a in a second position corresponding with the second position provided by first main mechanism 90a (FIGS. 6A-6C). As first bracket 50a corresponds with a curved part of container transport line 22, when first bracket 50a is moved away from container transport line 22, the path of first bracket 50a (and first neck guide 30a) increases in length. As described above, as first main mechanism 90a is fixed to first bracket 50a via tooling plate 110a, there is no relative motion therebetween in a direction along container transport line 22. Therefore, at first pivotable mechanism 92a, there is relative motion between first bracket 50a and first pivotable mechanism 92a to compensate for the increase in length. As illustrated in FIG. 7B, first bracket 50a moves to the left, and pivoting assembly 150a pivots therewith to allow for this relative movement. As such, the neck guide positioning system according to the principles of the present disclosure can operate along a container transport line having a non-linear path.

It should be understood that first pivotable mechanism 92a can also locate first bracket 50a in an intermediate position (not shown).

Figure 9:
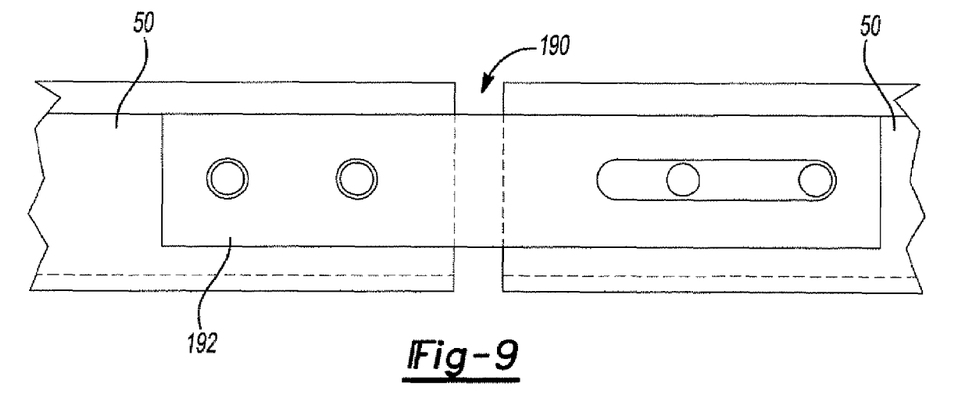
FIG. 9 is a side view of a pair of neck guide assemblies coupled with an alignment member.

Referring to FIG. 9, when the path of neck guide assemblies 32 is increased in length, a gap 190 is formed between adjacent brackets 50. Accordingly, an alignment member 192 is coupled between adjacent brackets 50 to maintain the alignment thereof. As shown in FIG. 9, alignment member 192 is fixed to one of brackets 50 and slidably received by the other of brackets 50 to provide for relative motion therebetween.

Additionally, as explained herein, neck guides 30 are attached to brackets 50 to provide for relative motion therebetween in a direction parallel to container transport line 22. As such, when the path of brackets 50 is increased in length and gaps 190 are formed between adjacent brackets 50, neck guides 30 stretch and move relative to brackets 50 to extend over gaps 190 and, therefore, extend continuously along container transport line 22. Neck guides 30 can be provided sized to be at least as long as the path of neck guide assemblies 32 and brackets 50 corresponding with the largest size of containers 24. Therefore, according to the principles of the present disclosure, container transport system 20 has neck guides 30 extending continuously along container transport line 22.

Figure 10:
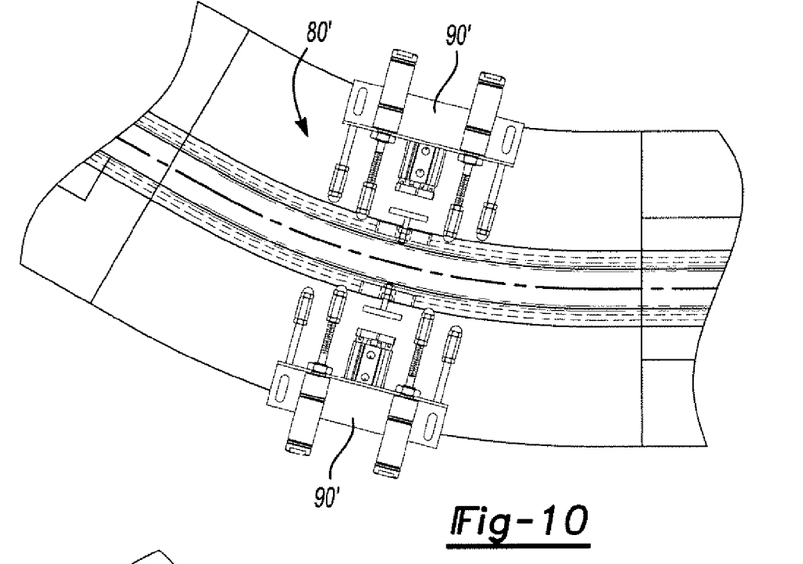
FIG. 10. is a top view of another portion of the container transport line according to the principles of the present disclosure.
Figure 11:
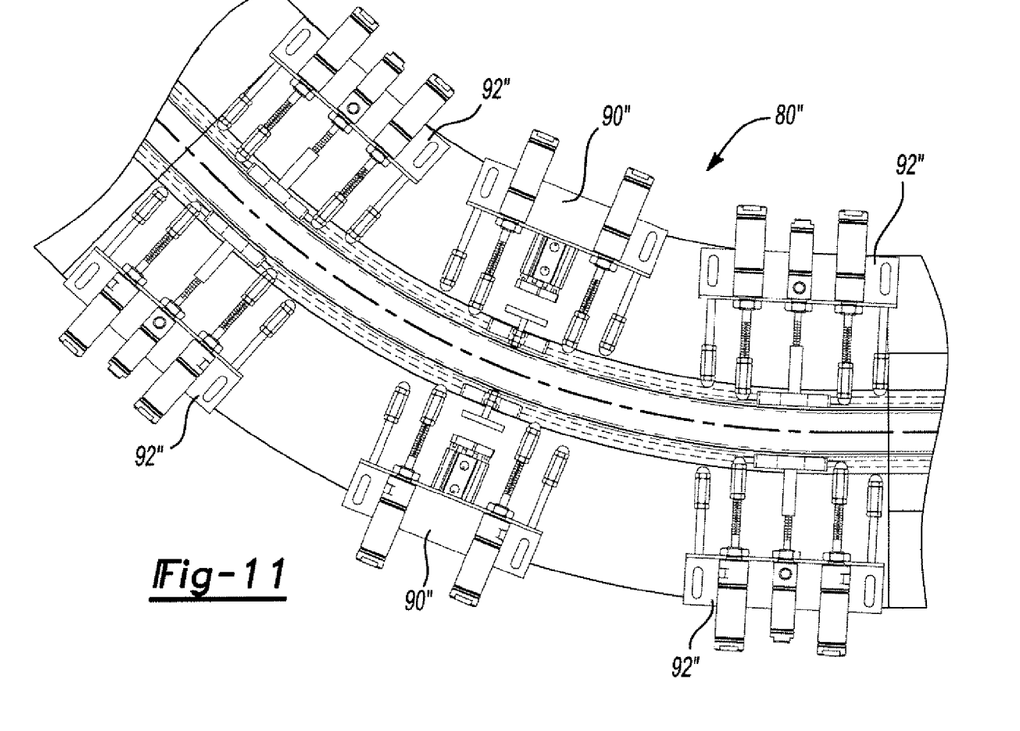
FIG. 11 is a top view of another portion of a container transport line according to the principles of the present disclosure.

Referring to FIGS. 10 and 11, exemplary alternate curved sections of container transport line 22 are illustrated. In FIG. 10, a curved section 80' includes a singe pair of main mechanisms 90' coupled proximate thereto. In FIG. 11, a curved section 80" includes a plurality neck guide positioning mechanisms 40". In particular, a pair of main mechanisms 90" are coupled at center positions of curved section 80", and a plurality of pivotable mechanisms 92" are coupled around main mechanisms 90".

The present disclosure is exemplary in nature and, therefore, can vary in many ways. A container transport system and container transport line can have a variety of configurations and components. Neck guide assemblies and neck guide positioning mechanism can also have a variety of configurations and components. The components described herein can be made from a variety of materials.

What is claimed is:

1. A neck guide positioning system for a container transport line, said neck guide positioning system comprising:
    a plurality of stop members including a first stop member and a second stop member, said first stop member being fixed relative to the container transport line, said second stop member being selectively movable between an extended position and a retracted position, said extended position being between the container transport line and said first stop member, said retracted position being further away from the container transport line than said first stop member;
    a neck guide assembly including a bracket and a neck guide; and
    a first actuator operably coupled to said bracket to move said bracket relative to said plurality of stop members;
    wherein moving said second stop member to said retracted position and engaging said bracket with said first stop member locates said neck guide in a first location, and moving said second stop member to said extended position and engaging said bracket with said second stop member locates said neck guide in a second location.

2. The neck guide positioning system of claim 1, further comprising a second actuator fixed relative to the container transport line, said second actuator supporting said second stop member and selectively moving said second stop member between said extended and retracted positions.

3. The neck guide positioning system of claim 2, wherein said second stop member includes a shaft engaged with said second actuator and a stop end disposed on said shaft opposite said second actuator.

4. The neck guide positioning system of claim 3, wherein said stop end is adjustable on said shaft.

5. The neck guide positioning system of claim 4, wherein said shaft has a threaded outside surface and said stop end has a threaded inside surface, said threaded outside surface of said shaft and said threaded inside surface of said stop end engaging each other.

6. The neck guide positioning system of claim 2, wherein said second actuator is an air cylinder.

7. The neck guide positioning system of claim 1, wherein said neck guide is secured relative to said bracket in a first direction defined from said bracket to the container transport line, said neck guide being movable relative to said bracket in a second direction defined along the container transport line.

8. The neck guide positioning system of claim 7, wherein said bracket includes an end having a toothed outer surface engaging and securing said neck guide relative to said bracket.

9. The neck guide positioning system of claim 1, further comprising a pivoting assembly coupled between said bracket and said first actuator, said pivoting assembly providing for relative movement between said bracket and said first actuator in a direction defined along the container transport line.

10. The neck guide positioning system of claim 9, wherein said pivoting assembly includes a bracket member fixed to said bracket, an actuator member fixed to said first actuator, and an intermediate member pivotally coupled to each of said bracket member and said actuator member.

11. The neck guide positioning system of claim 1, further comprising a tooling plate secured to said bracket and operably coupled to said first actuator.

12. The neck guide positioning system of claim 1, wherein said first actuator is an air cylinder.

13. A container transport system comprising:
    an infeed machine for collecting a plurality of containers;
    a discharge machine for receiving said containers;
    a container transport line extending between said infeed machine and said discharge machine;
    a pair of neck guide assemblies each supporting a neck guide along opposite sides of said container transport line; and
    a plurality of neck guide positioning mechanisms each including:
    a plurality of stop members including a first stop member and a second stop member, said first stop member being secured relative to said container transport line, said second stop member being selectively movable to an extended position and a retracted position, said extended position being between said container transport line and said first stop member, said retracted position being further away from said container transport line than said first stop member, and an actuator operably coupled to one of said neck guide assemblies to move said one of said neck guide assemblies relative to said plurality of stop members, wherein moving said second stop members to said retracted positions and engaging said neck guide assemblies with said first stop members locates said neck guides in a first location, and moving said second stop members to said extended positions and engaging said neck guide assemblies with said second stop members locates said neck guides in a second location.

14. The container transport system of claim 13, wherein said container transport line defines a path having a non-linear portion therein, said neck guides extending continuously along said path of said container transport line.

15. The container transport system of claim 14, wherein each of said neck guide assemblies includes a plurality of brackets, each of said brackets extending along a portion of one of said sides of said container transport line, said neck guide assemblies further including alignment members coupled between adjacent pairs of said brackets, said alignment members being fixed to one of said brackets and slidably engaged with the other of said brackets so as to allow for relative movement between adjacent brackets.

16. The container transport system of claim 14, further comprising a pivoting assembly coupled between one of said neck guide assemblies and said actuator of one of said neck guide positioning mechanisms, said pivoting assembly having a bracket member fixed to said one of said guide assemblies, an actuator member fixed to said actuator, and an intermediate member pivotally coupled to each of said bracket member and said actuator member, said pivoting assembly allowing for relative movement between said one of said guide assemblies and said actuator in a direction defined along said container transport line.

17. The container transport system of claim 14, further comprising a tooling plate secured to one of said neck guide assemblies, said tooling plate being operably coupled to said actuator of one of said neck guide positioning mechanisms, said tooling plate and said one of said neck guide positioning mechanisms being disposed at a center position of said non-linear portion of said path of said container transport line.

18. The container transport system of claim 13, wherein said neck guide positioning mechanisms are arranged at opposing positions along said opposite sides of said container transport line.

19. The container transport system of claim 13, further comprising a control system having a communication line extending along said container transport line and operably connected to said neck guide positioning mechanisms, said control system receiving inputs and operating said neck guide positioning mechanisms to locate said neck guides in accordance with said inputs.

20. A method of positioning a neck guide for a container packaging system, said method comprising:
fixing a first stop member relative to a container transport line in correspondence with a first container shape;
engaging a neck guide assembly with said first stop member, said neck guide assembly supporting a neck guide along said container transport line;
disengaging said neck guide assembly and said first stop member;
locating a second stop member between said first stop member and said container transport line in correspondence with a second container shape; and
engaging said neck guide assembly with said second stop member.

* * * * *